April 25, 1933. C. L. KASSON 1,905,412
METHOD OF TESTING
Filed March 14, 1927
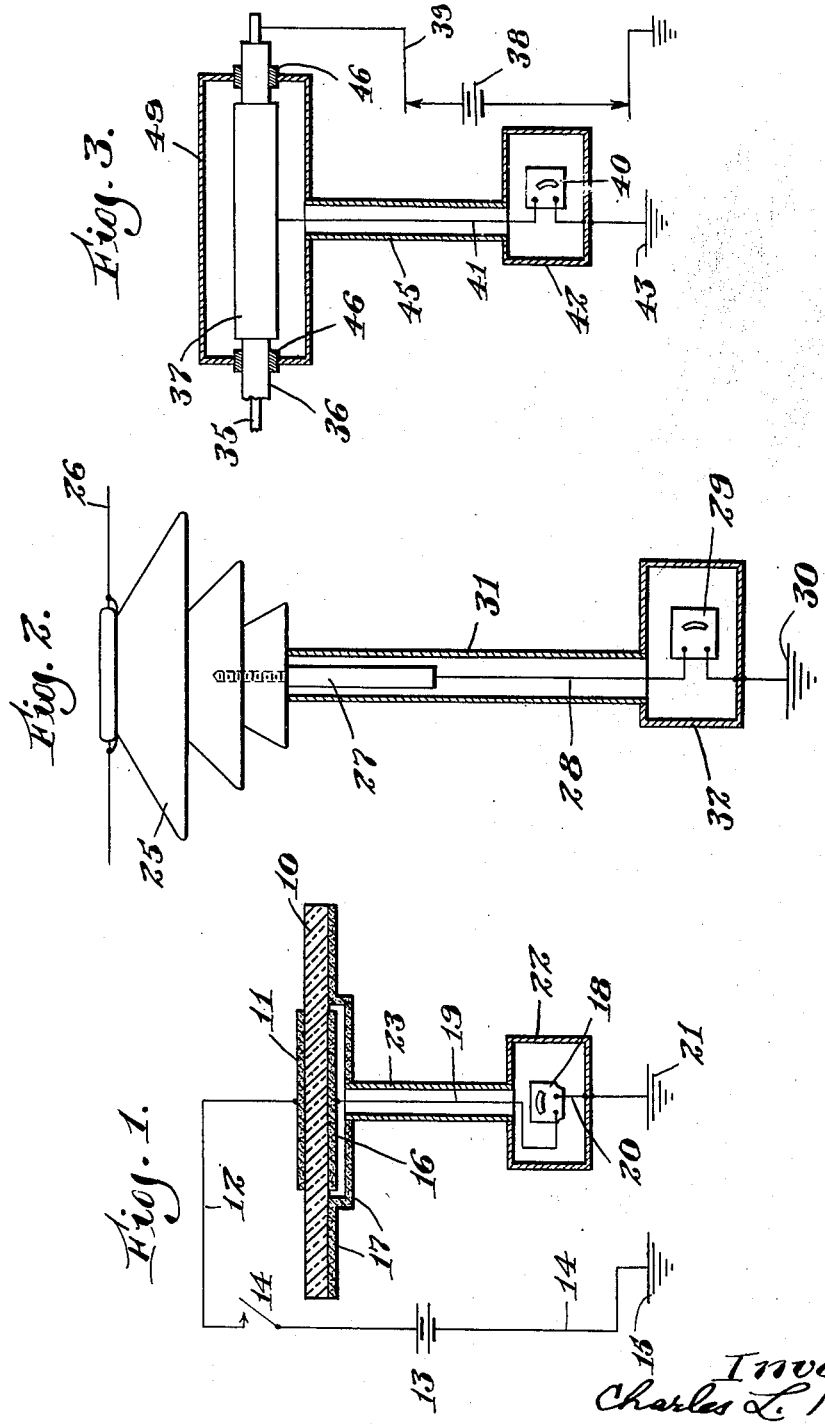
Inventor
Charles L. Kasson
by James R. Hodde
Attorney Patented Apr. 25, 1933

1,905,412

UNITED STATES PATENT OFFICE

CHARLES L. KASSON, OF MATTAPAN, MASSACHUSETTS

METHOD OF TESTING

Application filed March 14, 1927. Serial No. 175,221.

My present invention relates to an improved method of testing or determining the electrical characteristics of insulating material.

At the present time, an important item in the electrical field is the determining of the electrical characteristics, such, for example, as electrical leakage current, electrical power input, such as the dielectric loss and electrical energy input, to the insulating material and practically all of the electrical supplies purchased at the present time are bought on the basis of the electrical characteristics of the insulating material embodied therein. It is, therefore, important to determine accurately what such electrical characteristics are in order that the manufacturer may be able to produce an article or articles in which the dielectric losses of the insulating material, for example, may not exceed a certain predetermined amount and the purchaser of such supplies may be able to determine whether or not the articles so bought are suitable for his purpose and come up to specifications.

Specifically it is desirable and essential to be able to determine quickly and accurately the dielectric losses in the insulation of a power cable where the frequency of the power to be transmitted thereover does not exceed, for example, 500 cycles per second or to determine quickly and accurately the dielectric losses of an insulator for a transmission line. In setting a limit to the frequency of 500 cycles per second, it is not desired to infer that applicant's improved method cannot be utilized on greater frequencies and it is desired simply to differentiate between the ordinary commercial frequencies of electric transmission lines and the frequencies employed in radio reception and transmission.

In developing my invention, I have found that the ordinary methods employed in testing the dielectric losses, for example, in insulating material, give results that are not true and have found that the reason for this is due to the fact that no method has heretofore been devised for excluding from the measuring instruments the current which flows through the medium surrounding the insulating material, and, therefore, the result obtained by the indicating instrument is the total of the current passing through the dielectric and that passing around the dielectric.

In carrying out my invention, I have devised a method whereby all of the electricity flowing around or on the outside of the dielectric to be measured is shunted or grounded around the electrical indicating instrument, and, therefore, the only current measured and indicated by the indicating instrument is that current which passes through the dielectric, and which, in reality, is the only current that should be measured in order to determine accurately the electrical characteristics of the dielectric.

The object of my invention, therefore, is an improved method of testing the electrical characteristics of insulating material and the like.

In the accompanying drawing illustrating several applications of my improved method, Fig. 1 is a schematic layout of the method as applied to the testing of the electrical characteristics of a plain slab of insulating material;

Fig. 2 is a schematic layout of the method as applied to the testing of an insulator for a transmission line, and Fig. 3 is a schematic layout of the method as applied to testing of the electrical characteristics of the insulating material of the power cable.

Referring to Fig. 1, 10 designates a slab of insulating material, the electrical characteristics of which are to be determined, and on one face thereof is placed an electrode 11 of any suitable size or shape, such electrode being connected by means of conductor 12 to a source of power 13, such conductor 12 including a switch 14, by means of which the source of power 13 may be connected to the electrode 11. The source of power 13 is connected, for example, by conductor 14 to the ground 15. On the face of the slab of insulating material opposite the face on which the electrode 11 is applied, is a second electrode 16, preferably smaller in area than the electrode 11 and also applied to this face of the slab of insulating material 10 is a second electrode or shield 17, which, it will be noticed from an inspection of Fig. 1, is electrically disconnected from the electrode 16. 18 indicates an electrical measuring and indicating device, such as a galvanometer or dynamometer, one terminal of which is connected by conductor 19 to the electrode 16, and the other terminal is connected by conductor 20 to ground at 21. Surrounding the measuring instrument 18 is a shield 22 of any suitable material, such as copper or lead, this shield being connected to and grounded by the conductor 20 leading from one terminal of the instrument 18. Connecting the shield 22 and the shield 17, and surrounding the conductor 19, is a tubular shield 23. Obviously if the switch 14 is closed, a circuit will be completed from the source 13 over the conductor 12, to the electrode 11, thence through the insulating material 10 to the electrode 16, through the conductor 19, into the indicating and measuring instrument 18, and to ground through the conductor 20, and back to the source of power 13. While the flow of current through the insulating material 10 may be very slight, there will be a flow of current and the amount of such flow will be indicated on the instrument 18. There will be, under all circumstances, a flow of current from the electrode 11 around the outside of the insulating material 10. In the absence of preventative means such current will, or would, pass into conductor 19 and thence through the instrument 18, where it would be measured. Electrode 16 being shielded by shield 17, conductor 19 being shielded by the tubular shield 23, and instrument 18 being shielded by shield 22, any stray currents that may pass over or around the outer surface of the insulating material 10 will be collected by the shields 17, 22, and 23, and such currents will pass through the shields into ground at 21 without passing through the indicating instrument 18. The current passing through the indicating instrument 18, therefore, will be only that current that passes through the insulating material 10 from the electrode 11 to the electrode 16 and will be a true measurement of the electrical characteristics of such dielectric 10.

Referring now to Fig. 2, wherein is shown the method employed in testing an insulator, 25 designates the insulator, to which is attached a power conductor 26. To the central pin 27 of the insulator 25 is attached a conductor 28 leading to and passing through an electrical indicating and measuring instrument 29 and from thence to ground at 30. Surrounding the pin 27 and conductor 28 is a tubular shield 31 of any suitable conducting material, such as copper or lead, and the lower end of this tubular shield 31 is electrically connected to a shield 32 surrounding the indicating instrument 29. If electricity is passing through the power conductor 26, there will be a passage of electricity from the conductor 26 around the insulator 25 and a certain portion of the electricity from the power conductor 26 will also pass through the material of the insulator 25 and into the pin 27 of conducting material. That electricity passing around the insulator 25 will tend to flow to ground and, instead of passing to ground by way of the pin 27 and conductor 28, will be collected or guided by the cylindrical shield 31 and will pass downward to ground at 30 through the surface of the shield 32. That electricity which passes through the insulating material of the insulator 25 will pass downward through the pin 27 of conducting material, the conductor 28 and the indicating instrument 29, where the amount of electricity will be measured and which will be a true measure of the electrical characteristics of the insulator.

Referring now to Fig. 3, there is shown a section of power cable in which 35 is the conductor, surrounded by insulating material 36, and the entire structure surrounded by a lead sheath 37. In order to obtain a measure of the electrical characteristics of the insulating material 36, I connect a source of power 38 to the conductor 35 by means of a conductor 39, and connect the lead sheath 37 to an electrical indicating and measuring instrument 40 by means of conductor 41. The electrical indicating and measuring instrument 40 is surrounded by a shield 42, which is grounded at 43. Surrounding the lead sheath 37 and connected to a guard ring 46 about the insulating material 36 is a cylindrical shield 49 which completely encloses the sheath 37. Also surrounding the conductor 41 and connecting the cylindrical shield 49 and the shield 42 is a tubular shield 45. Electricity passing from the source 38 over the conductor 39 to the cable conductor 35 will divide so that a small portion thereof will pass outward through the dielectric 36 into the lead sheath 37, where it will be led by means of the conductor 41 through the electrical indicating and measuring instrument 40 and the rest of the electricity from the source 38, or from any source other than the source of power 38, will be passed directly to ground through the shields 49, 45, and 42, and, therefore, the indications on the electrical measuring and indicating instrument 40 will be a true measure of the electrical characteristics of the insulating material 36, such electrical characteristics are mainly the electrical leakage current, the electrical power input, and the electrical energy input, or the like.

Having thus described my invention, what I claim as new is:

1. That improvement in the art of measuring the electrical leakage current, electrical power input, electrical energy input, or the like of an insulating material under an electrical stress which consists in completely electrically shielding the material, the measuring instruments, and connections thereto.

2. That improvement in the art of measuring the electrical leakage current, electrical power input, electrical energy input, or the like, of an insulating material under an electrical stress, which consists in completely electrically shielding the material, the measuring instruments and connections thereto, whereby only the current passing through the material, or the electrical power input, or electrical energy input to the material, is measured, and whereby the measurement of the electrical current passing around the material, or the measurement of electrical power input, or electrical energy input to the mediums adjacent to the material, is prevented.

In testimony whereof, I have signed my name to this specification.

CHARLES L. KASSON.